United States Patent [19]
Wetrich

[11] Patent Number: 4,540,078
[45] Date of Patent: Sep. 10, 1985

[54] CLUTCH LUBE CONTROL

[75] Inventor: Peter D. Wetrich, Cedar Falls, Iowa

[73] Assignee: Deere & Company, Moline, Ill.

[21] Appl. No.: 545,981

[22] Filed: Oct. 27, 1983

[51] Int. Cl.³ ........................ F16D 25/10; F16D 13/72
[52] U.S. Cl. ............................. 192/87.11; 192/113 B
[58] Field of Search ............... 192/113 B, 70.12, 87.11

[56] References Cited

U.S. PATENT DOCUMENTS

| | | | |
|---|---|---|---|
| 2,158,440 | 5/1936 | Spase | 192/113 B |
| 3,059,746 | 10/1962 | Christenson | 192/87 |
| 3,672,478 | 6/1972 | Riese et al. | 192/113 B |
| 3,696,893 | 10/1972 | Koivunen | 192/113 B |
| 3,760,918 | 11/1973 | Wetrich et al. | 192/113 B |
| 3,823,801 | 7/1974 | Arnold | 192/113 B |
| 3,913,616 | 10/1975 | Horsch | 192/113 B |
| 3,964,585 | 6/1976 | Murayama et al. | 192/113 B |
| 4,006,805 | 2/1977 | Zeller et al. | 192/113 B |

OTHER PUBLICATIONS

Deere & Company, "4-Wheel Drive Tractors", 1982, p. 23.

*Primary Examiner*—Alan Cohan
*Assistant Examiner*—John A. Rivell

[57] ABSTRACT

A hydraulic control circuit controls flow of cooling oil to a wet clutch. The circuit normally maintains a reduced or zero flow, but temporarily increases flow of cooling oil when the clutch changes from a disengaged to an engaged state.

6 Claims, 2 Drawing Figures

CLUTCH LUBE CONTROL

BACKGROUND OF THE INVENTION

This invention relates to a control system for controlling the flow of cooling and lube fluid through a torque-transmitting clutch.

In clutches, such as the traction or power-take-off (PTO) clutch on an agricultural vehicle, the clutch plates and discs are frictionally engaged. This friction generates heat and excessive heat can cause premature clutch wear and failure. For this reason, current production tractors, such as Deere 4-Wheel Drive Tractor Models 8450, 8650 and 8850, utilize hydraulically engaged wet clutches wherein cooled and filtered hydraulic oil is flowed through the clutch assembly. The cooling oil is flowed through these clutches continuously as long as they are engaged. However, energy is wasted when cooling oil flow is continued beyond the time when the excess heat has been removed from the clutch.

SUMMARY OF THE INVENTION

An object of the present invention is to provide an efficient system for cooling a torque-transmitting clutch.

Another object of the present invention is to provide clutch cooling while reducing clutch cooling oil flow after sufficient clutch cooling has been achieved.

A further object of the present invention is to provide an efficient system for cooling a plurality of hydraulically-operated torque-transmission clutches.

These and other objects are achieved by the present invention which includes a pair of pilot-operated valves which operate to increase and decrease flow of cooling oil through a traction clutch and a PTO clutch. A first valve circuit operates in response to traction clutch control pressure to normally maintain one of the pilot-operated valves in its reduced flow state and to temporarily place this one valve in its increased flow state when the traction clutch is changed from its disengaged to its engaged state. A second valve circuit operates the other pilot-operated valve in response to PTO clutch control pressure.

DETAILED DESCRIPTION

Figure 1:
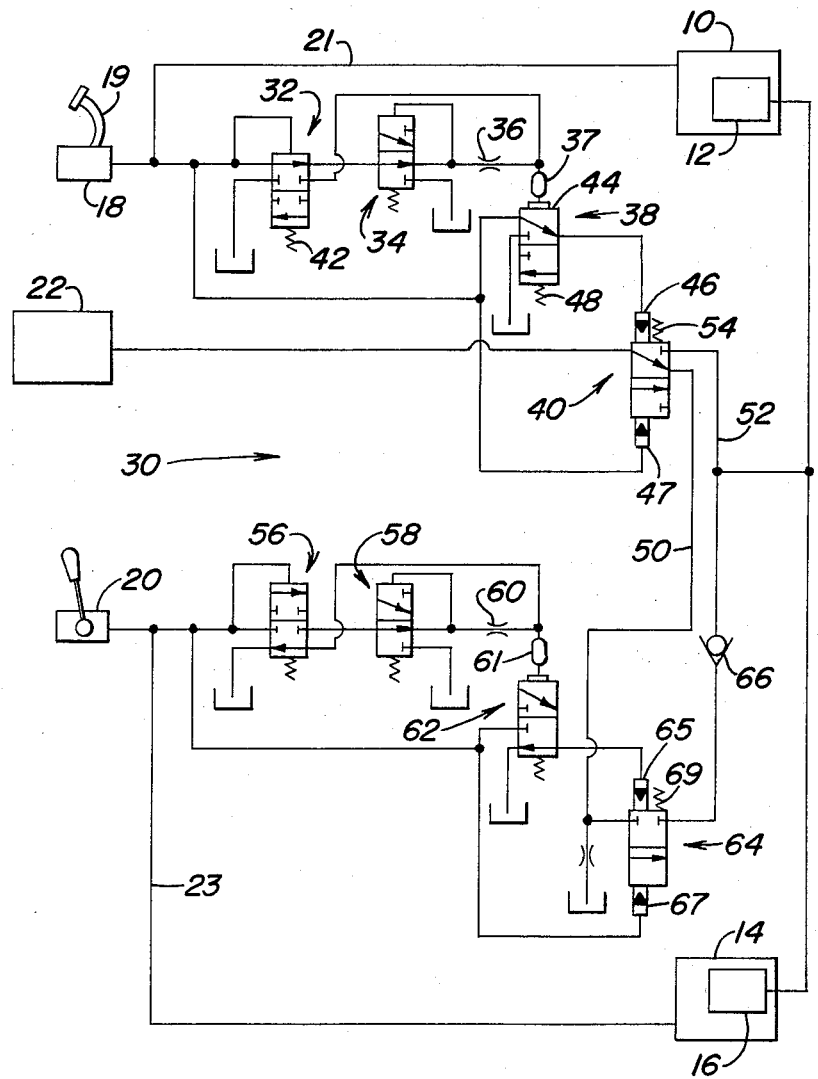
FIG. 1 is a schematic diagram of the applicant's clutch cooling control system.

A conventional agricultural tractor (not shown) has a conventional hydraulically-operated traction clutch 10 with a cooling or lubricating circuit 12 and a hydraulically-operated power-take-off (PTO) clutch 14 with a cooling or lubricating circuit 16. A conventional control valve 18, operated by pedal 19, controls the traction clutch 10 via line 21 while a conventional lever-operated valve 20 operates the PTO clutch via line 23. The tractor also includes a conventional source of lubricating oil 22.

A control circuit 30 controls communication of cooling or lube oil from source 22 to lube circuits 12 and 16 as a function of the clutch operating or control pressures from valves 18 and 20. Control circuit 30 has a first portion which includes a two-position, pressure-compensated shut-off actuating valve 32, a 5 psi pressure-limiting valve 34, a restriction 36, a time delay valve 38 and a lube clutch cut-off valve 40 having pilots 46 and 47.

The valve 32 includes a first position wherein operating pressure from valve 18 is coupled to time delay chamber 37 of valve 38 via pressure-reducing valve 34 and restriction 36 and a second position wherein chamber 37 is coupled directly to sump. A spring 42 biases valve 32 towards its second position so that the output of valve 32 will be limited to a preferred pressure of 150 psi or higher.

The time delay valve 38 has a spool 44 with a first position wherein operating pressure from valve 18 is coupled to a pilot 46 of cut-off valve 40 and a second position wherein pilot 46 is coupled to sump. A spring 48 maintains spool 44 in its second position, preferably, unless the pressure in chamber 37 exceeds 2 psi long enough to move time delay valve spool 44 to its first position.

Cut-off valve 40 has a first position wherein lube oil from source 22 is coupled to line 50 and a second position wherein lube oil is coupled to lube circuits 12 and 16 via line 52. Spring 54 maintains valve 40 in its first position, preferably unless the pressure in pilot 47 exceeds the pressure in pilot 46 by at least 15 psi.

A second portion of circuit 30 includes a shut-off actuating valve 56, a pressure reducing valve 58, a restriction 60, a time delay chamber 61, a time delay valve 62 and a lube cut-off valve 64. Valves 56, 58 and 62 are the same as valves 32, 36, and 38, previously described. The lube cut-off valve 64 is similar to valve 54 having pilots 65 and 67 and a biasing spring 69, but has only one output connection and therefore, a first position wherein line 50 is shut off from lube circuits 12 and 16 and a second position wherein line 50 is coupled to lube circuits 12 and 16 via check valve 66.

In an alternate embodiment of the present invention (shown in FIG. 2), a circuit 70 includes a reduction actuating valve 72, a pressure reducing valve 74, a restriction 76, a time delay chamber 77 and a time delay valve 78, all similar to valves 32, 36 and 38 of FIG 1, previously described.

Circuit 70 also includes a lube reduction valve 80 with pilots 81 and 83. Valve 80 has a first position wherein lube flow from source 22 is coupled to line 82 via a restriction 84 and to sump via restriction 86 and has a second position wherein source 22 is coupled directly to line 82. A spring 88 maintains valve 80 in its first position unless the pressure in pilot 83 exceeds the pressure in pilot 81 by at least 15 psi. Valve 80 is pressure-operated by pilots 81 and 83 which receive fluid pressure from time delay valve 78 and from traction clutch operating valve 18, respectively.

Circuit 70 also includes a lube reduction valve 90. Valve 90, itself, is a known valve which has been used since 1972 in John Deere vehicles with quad-range transmission and "permaclutches". The valve 90 includes a spool 92 which has opposite ends exposed to fluid pressure from traction clutch control valve 18 and from PTO clutch control valve 20. Spool 92 has stems projecting from its ends. A second spool 94 is movable between a first position communication line 82 to sump and a second position communicating line 82 to lube circuits 12 and 16. A spring 96 urges spool 94 towards its first position.

MODE OF OPERATION

Referring to the embodiment of FIG. 1, the control pressure from valve 18 is normally high and the traction clutch 10 is engaged. Thus, valves 32, 34, 38 and 40 are normally in the position shown, wherein line 52 is blocked with respect to lube oil from source 22 and source 22 is coupled to valve 64 via line 50. However, the control pressure from valve 20 is normally low and the PTO clutch is normally disengaged with valves 56, 58, 62 and 64 also normally in the positions shown. Thus, valve 64 will be closed and lube oil is prevented from flowing to lube circuits 12 and 16.

When pedal 19 is depressed to disengage clutch 10, the control pressure from valve 18 drops and valve 32 shifts to connect the time delay chamber 37 to sump, thus shifting time delay valve 38 to its second position wherein pilot 46 is connected to sump. Since both pilots of valve 40 are connected to low pressure or sump, valve 40 remains in the position shown and lube flow remains blocked.

Now, if pedal 19 is released to re-engage traction clutch 10, then the lower pilot 47 of valve 40 immediately receives high pressure from valve 18. However, pilot 46 remains coupled to sump via time delay valve 38 until the time delay chamber 37 can be re-pressurized via lines 32 and 34 and restriction 36. Thus, upon re-engagement of traction clutch 10, valve 40 initially shifts to its second position wherein line 52 and the lube circuits 12 and 16 are coupled to lube source 22. In the meantime, the time delay chamber 37 is being re-pressurized so that preferably, in 20-30 seconds, time delay valve 38 will return to its first position (illustrated) wherein pilot 46 is reconnected to high pressure from control valve 18. This equalizes the pressures in pilots 46 and 47 so that spring 54 will return valve 40 to its first position wherein line 52 and lube circuits 12 and 16 are blocked from lube oil source 22. Thus, during traction clutch disengagement, lube flow is cut off, but upon traction clutch re-engagement, lube flow is opened for a certain time period, after which lube flow is again cut off until another disengagement/re-engagement has occurred.

Valves 56, 58, 62 and 64 operate in a simlar manner in response to the control pressure from PTO control valve 20, except that the PTO control pressure is normally low while the PTO clutch 14 is disengaged. Upon engagement of PTO clutch 14, the control pressure from control valve 20 goes high, thus immediately acting upon pilot 67 to shift valve 64 from the position shown to its second position wherein lube flow from line 50 is coupled to the lube circuits 12 and 16 via check valve 66. In the meantime, valve 56 shifts and begins to pressurize the upper end of time delay valve 62 via pressure reducing valve 58 and restriction 60. Then, after a 20-30 second time delay, valve 62 shifts from the position shown to its second position wherein pilot 65 is pressurized, whereupon spring 69 returns valve 64 to the illustrated position to cut off the lube flow.

Figure 2:
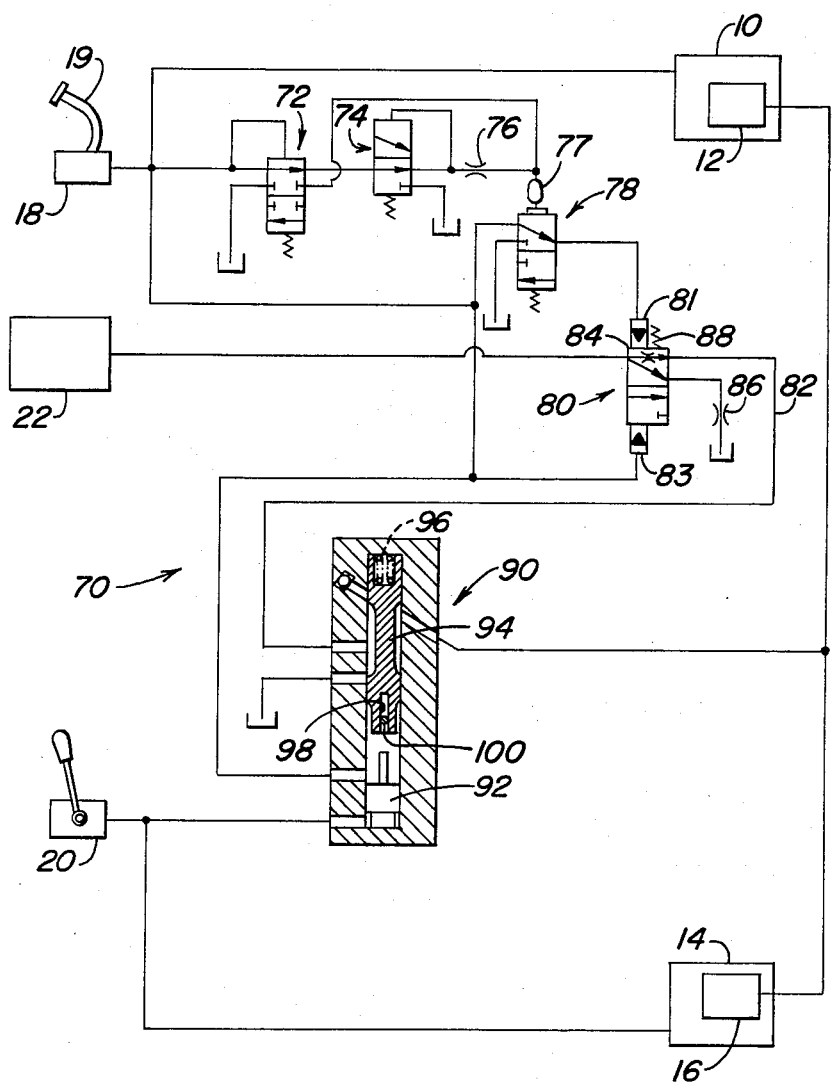
FIG. 2 is a schematic diagram of an alternate embodiment of applicant's invention.

In the embodiment of FIG. 2, as in the previous embodiment, the traction clutch control pressure from valve 18 is normally hogh and the PTO control pressure from valve 20 is normally low. These pressures put valves 72, 74, 78, 80 and 90 in the positions shown in FIG. 2 wherein valve 80 couples lube source 22 to lube circuits 12 and 16 via restriction 84 and valve 90.

When traction clutch pedal 19 is depressed to disengage the traction clutch 10, the pressure from valve 18 drops and valve 72 shifts to connect the time delay chamber 77 to sump, causing time delay valve 78 to shift and couple pilot 81 to sump. Since the pressure at pilot 83 is also reduced, time delay valve 80 remains in the reduced flow condition. However, the reduced control pressure from valve 18 permits spring 96 to shift spool 94 of valve 90 downwards (via FIG. 2) to block lube flow to lube circuits 12 and 16 until spool 94 engages pin 100.

When pedal 18 is released to re-engage the traction clutch 10, the pressure immediately rises at the pilot 83 and at the bottom side of spool 94, while time delay valve 78 keeps the pressure low at pilot 81. Thus, valve 80 shifts to its full open position and valve 90 shifts to open line 82 to lube circuits 12 and 14, thus permitting unrestricted lube flow immediately upon traction clutch re-engagement. This unrestricted lube flow continues for 20-30 seconds until time delay valve 78 shifts to re-pressurize pilot 81 which shifts valve 80 back to its reduced lube flow condition. The reduced flow condition continues until the next traction clutch disengagement/engagement occurs.

When spool 94 is in its lower or closed position, an increase in the normally low PTO clutch control pressure from valve 20 (due to PTO clutch engagement) will act on spool 92 to shift both spools 92 and 94 upwards, thus opening lube flow to both lube circuits 12 and 14 until the PTO clutch control pressure is reduced.

While the invention has been described in conjuction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

What is claimed is:

1. In a vehicle having a torque-transmitting clutch with a clutch lube circuit and having engaged and disengaged states, an operator control for controlling the engagement state of the clutch and a source of lube fluid, a system for controlling flow of lube fluid to the lube circuit, comprising:

a lube valve having an inlet for receiving lube fluid, an outlet coupled to the lube circuit and a spool movable between a first position wherein lube flow between the inlet and outlet is reduced and a second position wherein lube flow is increased; and control means coupled between the operator control and the lube valve and responsive to the operator control for normally maintaining the lube valve in its first reduced flow position and for temporarily maintaining the lube valve in its second increased flow position for a certain time period following a predetermined change in the engagement state of the clutch.

2. The invention of claim 1 wherein the control means comprises:

resilient means urging the lube valve to its first position;

a first pilot operable to move the lube valve to its first position in response to a signal received thereby;

a second pilot operable to move the lube valve to its second position in response to signals generated by the operator control;

a time delay valve having a time delay chamber and a spool movable in response to pressure in the time delay chamber to a first position communicating a first pressure signal to the first pilot and to a second position communicating a second pressure signal to the first pilot; and means coupled between the operator control and the time delay chamber for communicating the time delay chamber directly to a first pressure source when the clutch is changed by the operator control from one engagement state to the other and for communicating the time delay chamber to a second pressure source via a restriction when the clutch is changed by the operator control from the other engagement state to the one engagement state.

3. The invention of claim 2, wherein:

the first pressure signal comprises a pressure signal generated by the operator control;

the second pressure signal is reservoir pressure;

the first pressure source is a reservoir; and the second pressure source is the operator control.

4. The invention of claim 3, further comprising:

a further torque-transmitting clutch with a clutch lube circuit and having engaged and disengaged states;

a further operator control for controlling the engagement state of the further clutch;

a further lube valve having an inlet coupled to the lube fluid source, a first outlet coupled to the lube circuits of both clutches, a second outlet coupled to the inlet of the other lube valve, and a spool movable between a first position wherein the first outlet is blocked and the inlet is coupled to the second outlet and a second position wherein the second outlet is blocked and the inlet is coupled to the first outlet; and further control means coupled between the further control signal generator and the further lube valve and responsive to control signals from the further control signal generator for normally maintaining the further lube valve in its first position and for temporarily maintaining the further lube valve in its second position for a certain time period following a predetermined change in the engagement state of the further clutch.

5. The invention of claim 1, wherein:

the control means is responsive to the operator control for temporarily maintaining the lube valve in its second increased flow position following a change of the clutch from its disengaged to its engaged state.

6. In a vehicle having a traction clutch, a power-take-off (PTO) clutch, a lube circuit for cooling both clutches, a traction operator control for controlling engagement states of the traction clutch, a PTO operator control for controlling engagement states of the PTO clutch and source of lube fluid, a system for controlling flow of lube fluid through the lube circuit; comprising:

a first lube valve having an inlet communicated with the lube source, a first outlet communicated with the lube circuit, a second outlet and a spool having a first position blocking the first outlet and communicating the inlet with the first outlet and having a second position blocking the second outlet and communicating the inlet with the first outlet;

a second lube valve having an inlet port communicating with the second outlet, an outlet port communicating with the lube circuit and a spool having a first position blocking the inlet and outlet ports and a second position communicating the inlet port with the outlet port;

first control means coupled to the first lube valve and responsive to the traction operator control for normally maintaining the first lube valve spool in its first position and for temporarily placing the first lube valve spool in its second position in response to a change of the traction clutch from a disengaged to an engaged state; and second control means coupled to the second lube valve and responsive to the PTO operator control for normally maintaining the second lube valve spool in its first position and for temporarily placing the second lube valve spool in its second position in response to change of the PTO clutch from a disengaged to an engaged state.

* * * * *

UNITED STATES PATENT AND TRADEMARK OFFICE
CERTIFICATE OF CORRECTION

PATENT NO. : 4,540,078

DATED : 10 September 1985

INVENTOR(S) : Peter Donald Wetrich

It is certified that error appears in the above-identified patent and that said Letters Patent is hereby corrected as shown below:

Column 5, line 22, delete "3" and insert -- 1 --.

Signed and Sealed this

Third Day of June 1986

[SEAL]

Attest:

Attesting Officer

DONALD J. QUIGG

Commissioner of Patents and Trademarks